(12) United States Patent
Ngo

(10) Patent No.: US 6,848,921 B2
(45) Date of Patent: Feb. 1, 2005

(54) ELECTRICAL CONNECTOR WITH MODULE EJECTION SYSTEM

(75) Inventor: Hung Viet Ngo, Harrisburg, PA (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 10/447,420

(22) Filed: May 28, 2003

(65) Prior Publication Data

US 2005/0003688 A1 Jan. 6, 2005

(51) Int. Cl.$^7$ ................................................. H01R 13/62
(52) U.S. Cl. ...................................... 439/155; 439/923
(58) Field of Search ................................. 439/152, 155, 439/159, 328, 923, 630

(56) References Cited

U.S. PATENT DOCUMENTS

| | | | | |
|---|---|---|---|---|
| 4,780,793 A | * | 10/1988 | Ohtsuki ........................ | 361/756 |
| 5,413,497 A | | 5/1995 | Lwee .......................... | 439/328 |
| 6,203,378 B1 | * | 3/2001 | Shobara et al. .............. | 439/638 |
| 6,319,028 B1 | * | 11/2001 | Zhang et al. ................ | 439/159 |
| 6,361,338 B1 | * | 3/2002 | Chang ......................... | 439/159 |
| 6,382,995 B1 | * | 5/2002 | Bricaud et al. ............. | 439/159 |
| 6,398,567 B1 | * | 6/2002 | Nishimura ................... | 439/159 |
| 6,408,352 B1 | * | 6/2002 | Hosaka et al. .............. | 710/301 |
| 6,587,348 B2 | * | 7/2003 | Kondo ........................ | 361/741 |

FOREIGN PATENT DOCUMENTS

FR  2735599 A1  12/1996

* cited by examiner

Primary Examiner—Hien Vu
(74) Attorney, Agent, or Firm—Harrington & Smith, LLP

(57) ABSTRACT

An electrical connector including a frame, electrical contacts, and a system for retaining and ejecting an electronic module. The frame has a receiving area which is sized and shaped to removably received an end of at least one electronic module. The electrical contacts are connected to the frame. The contacts include spring contacts adapted to make removable connection to contact pads on the end of the electronic module at a first inserted position. The system for retaining and ejecting includes springs adapted to push on the end of the electronic module when the module is moved past the first inserted position. When the electronic module is inserted into the frame the contacts are adapted to make electrical connection with the contact pads on the end of the electronic module before the electronic module moves the springs.

23 Claims, 6 Drawing Sheets

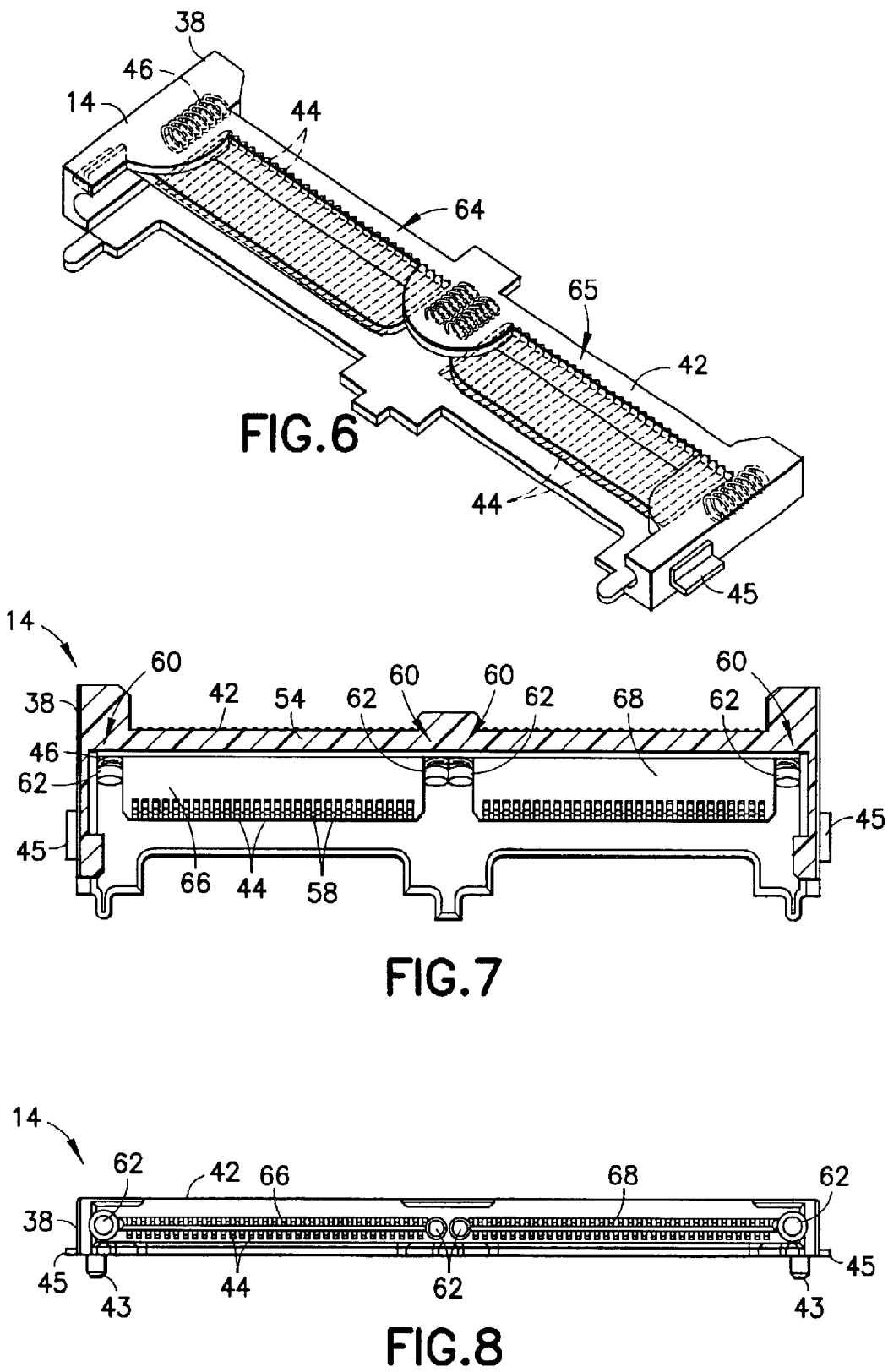

US 6,848,921 B2

ELECTRICAL CONNECTOR WITH MODULE EJECTION SYSTEM

BACKGROUND OF THE INVENTION

1. Field of the Invention

The present invention relates to electrical connectors and, more particularly, to a system for retaining and ejecting an electronic module with an electrical connector.

2. Brief Description of Prior Developments

As is well known, many of today's laptop, notebook, desktop and other computers, as well as computer peripherals and other electronic products, are designed to receive removable devices such as cards conforming to standards established by the Personal Computer Memory Card International Association (PCMCIA). These standards define the electrical and physical specifications of the card including the interfaces between the card and the port or slot into which the card is inserted. The specifications include a 16-bit PC Card interface and a 32-bit CardBus interface. The PCMCIA standards also specify three card form factors, called Type I, Type II and Type III. All three card types measure the same length (85.6 mm) and the same width (54.0 mm), and differ only in overall thickness. Thus, the Type I card has a thickness of 3.3 mm; the Type II card, 5.0 mm; and the Type III card, 10.5 mm. PCMCIA cards may be used for various purposes. For example, Type I cards are typically used for memory devices; Type II cards are typically used for I/O devices; and Type III cards are typically used to house rotating mass storage devices (disk drives). Presently, Type II cards are used principally as communication links, for example, for connecting the user of a host system such as a portable computer to an Ethernet LAN, as a data/fax modem for connecting the user to a subscriber telephone line system, or as a combined LAN and modem card.

There is a proposal for new types of PCMCIA cards or modules for electronic devices, such as laptop computers. The new types of PCMCIA cards can include a larger width card and one-half width cards. There is a desire to provide an electrical connector which can receive either the larger width card or, alternatively, two of the smaller width cards in a side-by-side configuration. There is also a desire to provide a PCMCIA electrical connector which has an ejection system that does not require a mechanical linkage assembly to eject the PCMCIA cards. There is also a desire to provide a PCMCIA electrical connector which has a card ejection spring that is not loaded when a card is inserted into the electrical connector at its operational inserted card position.

SUMMARY OF THE INVENTION

In accordance with one aspect of the present invention, an electrical connector is provided including a frame, electrical contacts, and a system for retaining and ejecting an electronic module. The frame has a receiving area which is sized and shaped to removably receive an end of at least one electronic module. The electrical contacts are connected to the frame. The contacts include spring contacts adapted to make removable connection to contact pads on the end of the electronic module at a first inserted position. The system for retaining and ejecting includes springs adapted to push on the end of the electronic module when the module is moved past the first inserted position. When the electronic module is inserted into the frame the contacts are adapted to make electrical connection with the contact pads on the end of the electronic module before the electronic module moves the springs.

In accordance with another aspect of the present invention, an electrical connector is provided comprising a frame having a receiving area which is sized and shaped to removably received an end of a first electronic module or alternatively receive ends of two side-by-side second smaller width electronic modules; electrical contacts connected to the frame; and a system for retaining and ejecting the electronic modules from connection with the electrical contacts. The system comprises a plurality of springs adapted to push on the ends of the electronic modules. The system comprises a push-to-eject system which requires a user to push the electronic modules in past a first inserted position and quickly release contact with the module to allow the module to be ejected by the springs. The retaining and ejecting system does not comprise a latch for latching the electronic modules to the frame.

In accordance with another aspect of the present invention, a PCMCIA electrical connector is provided comprising a frame having a receiving area which is sized and shaped to removably received an end of a first PCMCIA electronic module or alternatively receive ends of two side-by-side second thinner width PCMCIA electronic modules; electrical contacts connected to the frame; and a system for retaining and ejecting the electronic modules from connection with the electrical contacts. The system comprises a plurality of springs adapted to push on the ends of the electronic modules. The system comprises a push-to-eject system which requires a user to push the electronic modules in past the first inserted position and quickly release contact with the module to allow the module to be ejected by the springs. The retaining and ejecting system does not comprise a latch for latching the electronic modules to the frame. When the electronic modules are inserted into the frame the contacts are adapted to make electrical connection with the contact pads on the ends of the electronic modules before the electronic modules move the springs.

BRIEF DESCRIPTION OF THE DRAWINGS

The foregoing aspects and other features of the present invention are explained in the following description, taken in connection with the accompanying drawings, wherein:

FIG. 6 is a perspective view of the electrical connector shown in FIG. 5;

FIG. 7 is a cross sectional view of the electrical connector shown in FIG. 6;

FIG. 8 is a front elevational view of the electrical connector shown in FIG. 6;

DETAILED DESCRIPTION OF THE PREFERRED EMBODIMENTS

Figure 1:
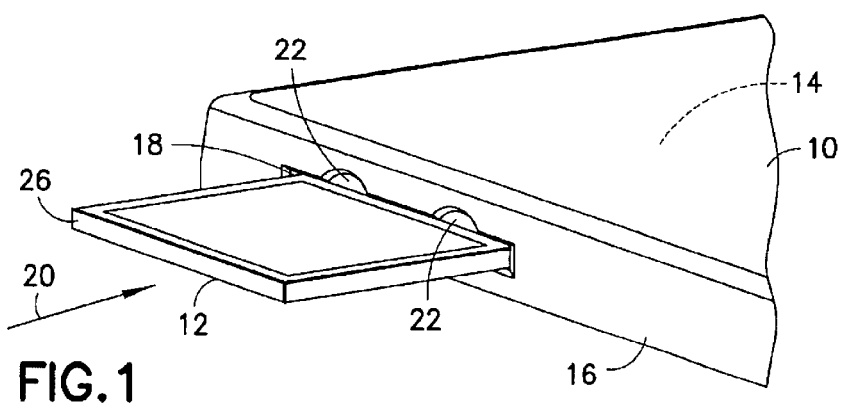
FIG. 1 is a partial perspective view of an electronic device with a removable electronic module, the electronic device comprising an electrical connector incorporating features of the present invention.

Referring to FIG. 1, there is shown a partial perspective view of an electronic device 10 with a removable electronic module 12. The module 12 is intended to be connected to the electronic device in a receiving slot 18 and by an electrical connector 14 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

The electronic device 10 generally comprises a laptop or notebook computer. However, features of the present invention could be incorporated into any suitable type of electronic device adapted to receive a removable electronic module. The electronic module 12 comprises a PCMCIA card. The electronic module 12 is different from prior PCMCIA cards. More specifically, the PCMCIA card 12 is wider than conventional PCMCIA cards. However, features of the present invention could be used with conventional PCMCIA cards.

Figure 2:
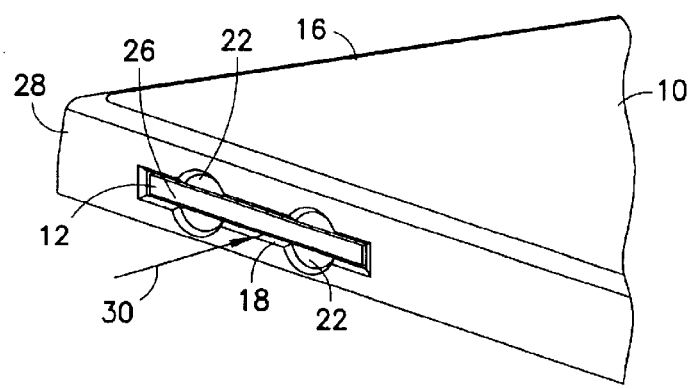
FIG. 2 is a partial perspective view of the electronic device and module as shown in FIG. 1 with the module inserted to a first inserted position.
Figure 3:
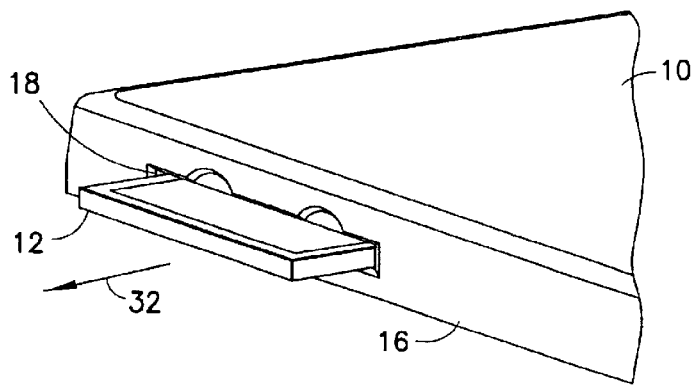
FIG. 3 is a partial perspective view of the electronic device and module as shown in FIG. 2 with the module partially ejected.

Referring also to FIGS. 2 and 3, the electrical connector 14 of the present invention uses a push-push connection system (i.e., a push-to-connect and a push-to-eject connection system) as further described below. The electronic device 10 comprises a housing 16. The housing 16 comprises a slot 18. The slot 18 is sized and shaped to removably received the electronic module 12. The electronic module 12 can be slid into the slot 18 as indicated by arrow 20. The entrance to the slot 18 includes two recessed areas 22. The slot 18 bisects the two recessed areas 22. The leading edge 24 of the electronic module 12 includes an electrical connection section 25 (see FIG. 9). The electrical connection section makes electrical connection to the electrical connector 14 when the electronic module 12 is inserted into a fully connected first inserted position as shown in FIG. 2. In this first inserted position, the rear end 26 of the electronic module 12 is substantially flush with the side 28 of the housing 16. However, when the electronic module 12 is at the first inserted position, the recessed areas 22 are located further in from the rear end 26 of the module.

FIG. 3 shows the electronic module 12 at a partially ejected position. In order to partially eject the electronic module, the rear end 26 of the electronic module is pressed inward as indicated by arrow 30 in FIG. 2 by one or more fingers of a user into the recessed areas 22. The push-to-eject system requires a user to quickly release contact with the module 12 to allow the module to be ejected as indicated by arrow 32 into the position as shown in FIG. 3 by springs in the electrical connector 14. Sufficient area of the electronic module 12 is then available for the user to pull the module out of the slot 18 as indicated by arrow 32.

Figure 4:
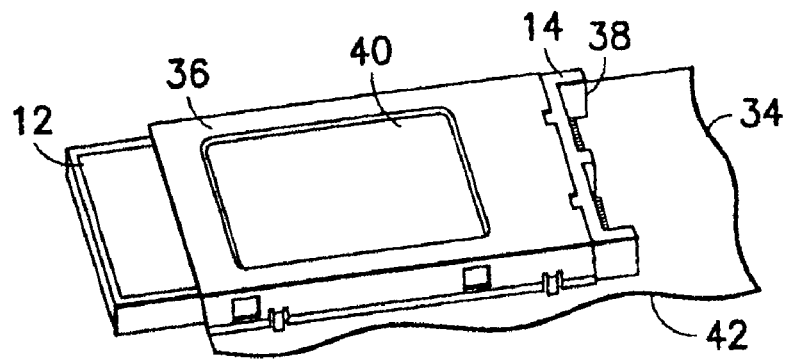
FIG. 4 is a partial perspective view of the electrical connector used in the electronic device shown in FIG. 1 shown attached to a printed circuit board and having the module inserted into the connector.
Figure 5:
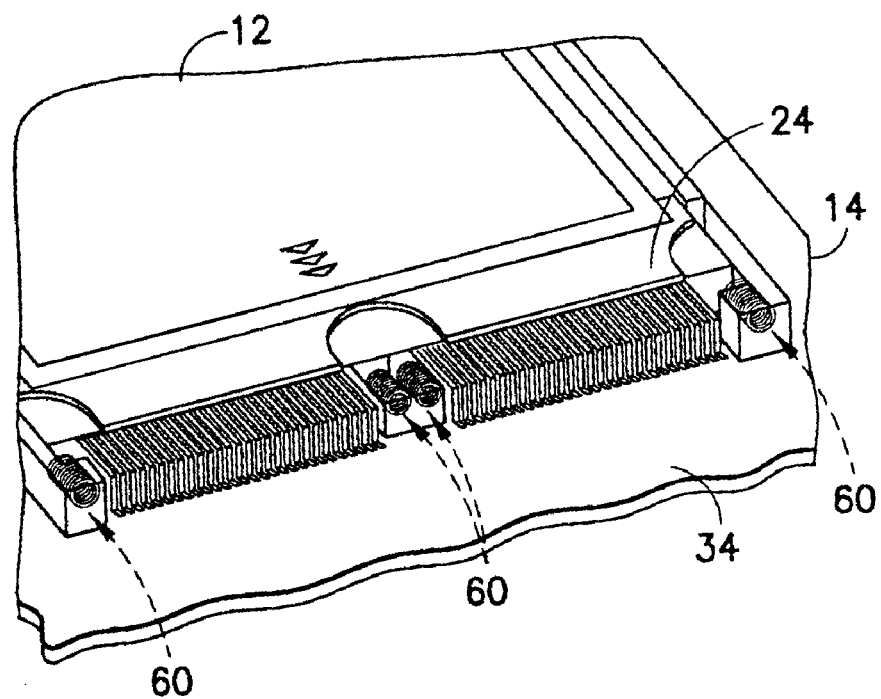
FIG. 5 is a partial enlarged perspective view of the electrical connector, printed circuit board, and module shown in FIG. 4, but with the EMI shield removed for clarity.

Referring now also to FIGS. 4–5, the electrical connector 14 is located inside the housing 16 and, more specifically, is attached to a printed circuit board 34. In this embodiment, the electrical connector 14 includes an electromagnetic interference (EMI) shield 36. In alternate embodiments, the EMI shield 36 might not be provided. The shield 36 is directly attached to the printed circuit board 34 and extends from the rear end of the slot 18 to the main connection section 38 of the electrical connector 14. The shield 36 covers a top side and two lateral sides of a receiving area 40 which receives the inserted electronic module 12.

Referring also to FIGS. 6–8, the main connection section 38 generally comprises a housing 42, electrical contacts 44, and a system 46 for retaining and ejecting the electronic module 12 from connection with the electrical contacts 44. The housing 42 is preferably comprised of dielectric material, such as molded plastic or polymer material. The housing 42 is adapted to be directly mounted to the printed circuit board 34, such as by through-hole mounting posts 43 and solder brackets 45. The housing 42 forms a receiving area 48 which is sized and shaped to receive the leading end 24 of the electronic module 12. The housing 42 comprises a bottom 50, two lateral sides 52, a back wall 54, and top sections 56 which define the receiving area 48. The housing 42 also comprises two contact support sections 66, 68. The contact support sections extend in a general cantilevered fashion forward from the back wall 54 into the receiving area 48.

The electrical contacts 44 comprise spring contacts. The electrical contacts 44 comprise rear ends which are connected to the printed circuit board 34, such as by through-hole mounting or by surface solder mounting. The electrical contacts 44 extend through the back wall 54, through the contact support sections 66, 68 and have contact areas 58 which extend downward through holes in the contacts support sections 66, 68 and into the bottom of the receiving area 48. In the embodiment shown, the electrical contacts 44 are arranged in two arrays 64, 65; one array at each one of the contact support sections 66, 68.

The retaining and ejecting system 46 generally comprises a first system for retaining the electronic module with the electrical connector and a second system for ejecting the electronic module from contact with the electrical contacts. The ejecting system generally comprises springs 60 connected to the housing 42. In the embodiment shown, the springs 60 include pusher caps 62 at their front ends. In an alternate embodiment, the pusher caps 62 might not be provided. The springs could directly contact the electronic module(s). The ejecting system comprises four of the springs 60. The four springs 60 are located against the back wall 54 of the housing. Two of the springs are located at opposite lateral ends of the receiving area 48. The other two springs are located in the middle of the receiving area; laterally next to each other. As seen best in FIG. 7, the front ends of the pusher caps 62 are located behind the contact areas 58 of the electrical contacts 44. The front ends of the pusher caps 62 are also located in front of the back wall 54. The pusher caps 62 can be moved back towards the back wall 54 with the springs 60 being compressed. The back wall 54 comprises recessed areas to accommodate the springs 60 and the pusher caps 62.

Figure 9:
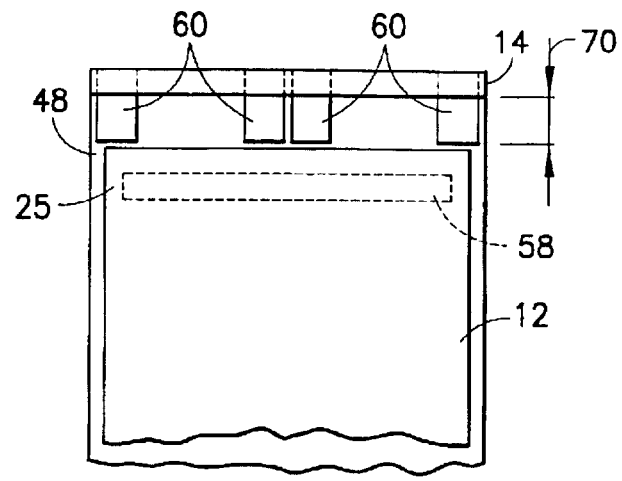
FIG. 9 is a schematic top view showing the electronic module and electrical connector at the position shown in FIG. 2.
Figure 10:
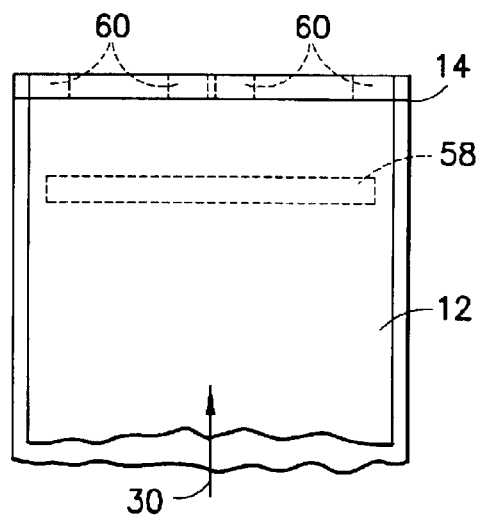
FIG. 10 is a schematic top view as in FIG. 9 showing the electronic module inserted past the first inserted position shown in FIG. 9.
Figure 11:
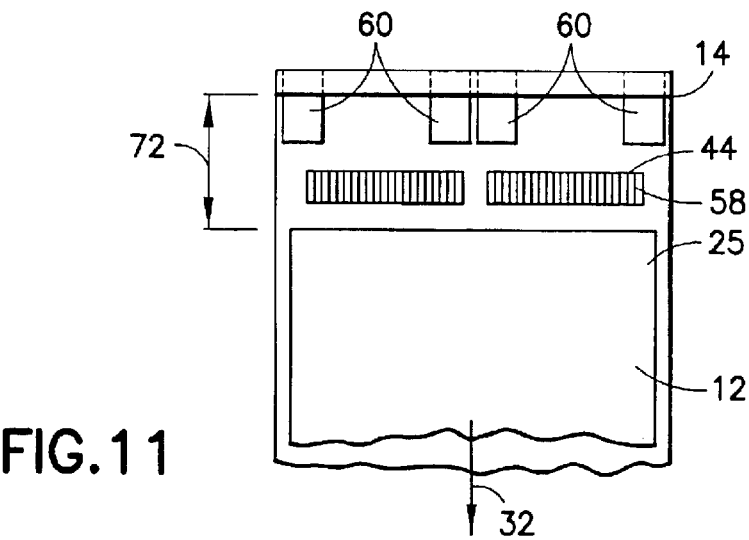
FIG. 11 is a schematic top view as in FIGS. 9 and 10 showing the electronic module ejected by the springs the contact sections of the electrical contacts to the position shown in FIG. 3.

Referring now also to FIGS. 9–11, there are shown schematic illustrations showing the electronic module at various positions. FIG. 9 shows the electronic module 12 at the first inserted position corresponding to FIG. 2. In this first inserted position the electrical connection section 25 of the electronic module 12 is located in the receiving area 48. More specifically, electrical contact pads on the electrical connection section 25 are in electrical contact with the contact areas 58 of the electrical contacts 44. The front end of the electronic module 12 can contact the pusher caps on the springs 60, but does not significantly depress the springs.

Figure 12:
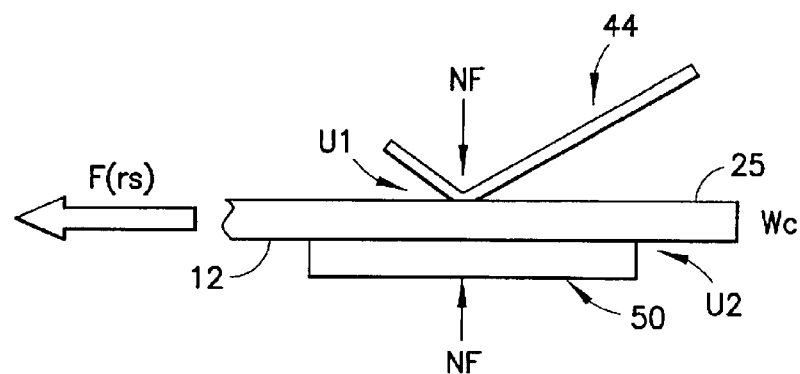
FIG. 12 is a schematic diagram showing contact of the electrical connector with the electrical connection section of the electronic module.

Referring also to FIG. 12, the retainment of the electronic module 12 with the electrical connector 14 is provided by contact of the electrical connection section 25 between the electrical contacts 44 and the bottom 50 of the housing 42. More specifically, the contacts 44 bias the electrical connection section 25 against the top side of the bottom 50 of the housing. Frictional forces between the contact 44 and the electrical connection section 25, and between the electrical connection section 25 and the bottom 50 of the housing provide sufficient retainment force to retain the electronic module 12 inside the slot 18.

Referring now to FIG. 10, the electronic module 12 is shown inserted past the first inserted position to an over-inserted position. The electronic module is pushed into the connector past the fully connected position. This occurs when the user presses the rear end 26 of the electronic module 12 inward at the recessed areas 22. The springs 60 are compressed. The leading edge of the electronic module 12 can be pushed against the front side of the back wall 54. The electronic module can be pushed inward a distance 70 from its first inserted position shown in FIG. 9 to the position shown in FIG. 10. When the user releases the electronic module 12, the springs 60 are able to push the electronic module in an outward direction 32. The springs 60 provide sufficient force to move the electrical connection section 25 outward a distance 72 past the contact areas 58 of the contacts 44. Thus, the frictional engagement provided by clamping the module between the contacts 44 and the bottom 50 of the housing no longer exists and the module can be easily slid out of the connector.

Referring back to FIG. 12, the release force necessary to release the frictional retainment of the electronic module 12 with the contacts 44 generally comprises:

$$F(rs) > [2(U_1 \times N_C \times NF) + (U_2 \times W_C)]$$

where, $F(rs)$ is the module releasing spring force; $U_1$ is the coefficient of friction of contact; $N_C$ is the number of contacts; $NF$ is the normal force; $U_2$ is the coefficient of friction of the housing or frame; and $W_C$ is the module weight.

Figure 13:
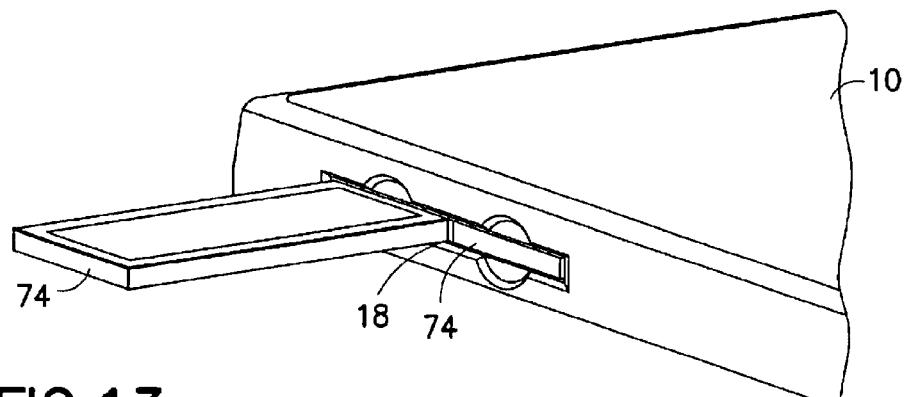
FIG. 13 is a partial perspective view of the electronic device shown in FIG. 1 and showing two different second electronic modules being connected to the electronic device and the electrical connector shown in FIGS. 4–8.
Figure 14:
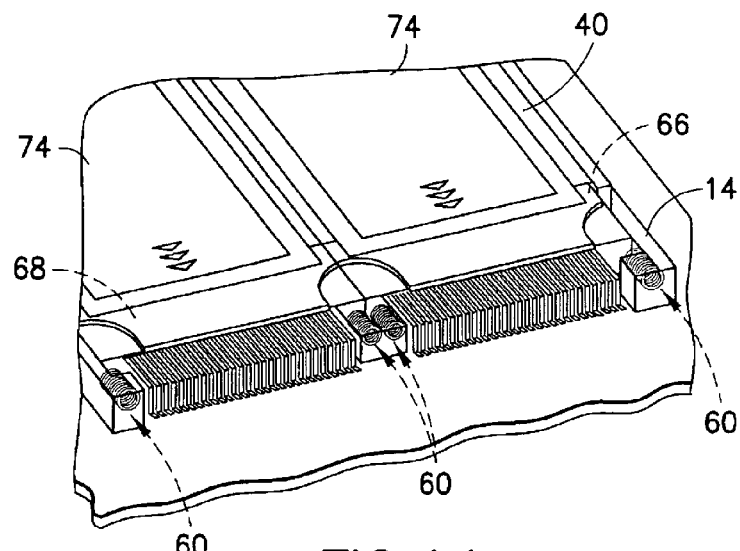
FIG. 14 is a partial perspective view of the two second electronic modules shown in FIG. 13 shown connected to the electrical connector.

Referring now also to FIGS. 13 and 14, the electrical connector 14 of the present invention is adapted to alternatively receive two second electronic modules 74. The second electronic modules 74 have a smaller width than the first electronic module 12; a little less than one-half the width. The two second modules 74 can be inserted into the slot 18 next to each other in a side-by-side configuration. One of the second modules 74 can receive the first contact support section 66 and make electrical connection with the electrical contacts on the first contact support section. The second one of the second modules 74 can receive the second contact support section 68 and make electrical connection with the electrical contacts on the second contact support section. With the arrangement of the springs 66, each of the second modules 74 can contact a pair of the springs; one spring at each lateral end of the front end of the modules 74. Thus, the module 74 can be separately inserted and separately ejected from the receiving area 40. The electromagnetic interference (EMI) cover 36 (see FIG. 4) can cover the top side of the receiving area and has a width for covering a top side of the first electronic module or top sides of the two second thinner width electronic modules.

Figure 15:
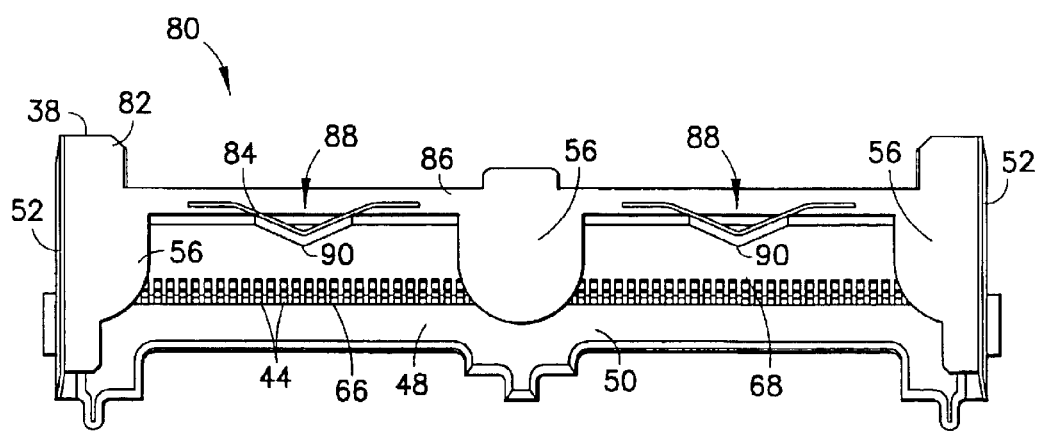
FIG. 15 is a top plan view of an alternate embodiment of the electrical connector shown in FIGS. 4–8.

Referring now also to FIG. 15, a top plan view of an alternate embodiment of the electrical connector shown. The electrical connector 80 is substantially similar to the electrical connector 14. The electrical connector 80 comprises a main connection section 38 having a housing 82, electrical contacts 44, and a system 84 for retaining and ejecting the electronic module(s) 12 or 74 with the electrical contacts 44. The housing 82 is preferably comprised of dielectric material, such as molded plastic or polymer material. The housing 82 is adapted to be directly mounted to the printed circuit board, such as by through-hole mounting posts and solder brackets. The housing 82 forms a receiving area 48 which is sized and shaped to receive the leading end of the electronic module(s) 12 or 74. The housing 42 comprises a bottom 50, two lateral sides 52, a back wall 86, and top sections 56 which define the receiving area 48. The housing 82 also comprises two contact support sections 66, 68. The contact support sections extend in a general cantilevered fashion forward from the back wall 86.

The electrical contacts 44 extend through the back wall 86, through the contact support sections 66, 68 and have contact areas which extend downward through holes in the contact support sections 66, 68 and into the bottom of the receiving area 48. In the embodiment shown, the electrical contacts 44 are arranged in two arrays; one array at each one of the contact support sections 66, 68.

The retaining and ejecting system 84 generally comprises a first system for retaining the electronic module(s) with the electrical connector and a second system for ejecting the electronic module(s) from contact with the electrical contacts. The retaining system comprises a frictional type of retaining system identical to that described above with the first embodiment. The ejecting system generally comprises springs 88 connected to the housing 82. The ejecting system comprises two of the springs 88. However, in alternate embodiments, more or less than two springs could be provided.

The two springs 88 comprise leaf springs. The springs 88 are mounted in the back wall 86 of the housing and have sections 90 which extend forward from the front face of the back wall; but not all the way forward to the contact sections of the contacts. Opposite ends of each leaf spring are mounted in the back wall 86. The ends of the leaf springs 88 can laterally slide within slots in the back wall. However, in alternate embodiments, one or more of the ends of the leaf springs could be stationarily fixed. The sections 90 have a forward projecting shape. The sections 90 can be resiliently deflected back towards the back wall 86. The springs 88 function substantially identically to the springs 66. This embodiment illustrates that any suitable type of biasing system could be provided for ejecting the modules from the connector so long as it can store a sufficient amount of force to eject the card in response to reward movement of the card post the normal card connection position.

With the present invention, a push-push method can be provided for attaching and disconnecting electronic modules from an electrical connector. With the present invention, the electrical connector can be manufactured at a relatively low cost and the electrical connector has a relatively compact height which is advantageous for a laptop type of electronic device, or other type of small height electronic device such as a hand-held device. With the electrical connector of the present invention no additional locking or latching mechanism is needed. This can reduce the cost of the electrical connector. However, in an alternate embodiment, a latch system could be provided.

In conventional PCMCIA electrical connectors, a tension spring or a compression spring or ejection is loaded while the PCMCIA card is inserted (i.e., there is a stored spring force). This causes forces on various components, and the springs can weaken over time. With an electrical connector incorporating features of the present invention, no force against the electrical connector or electronic module results from the springs while the module is at its operational inserted position (i.e., there is no stored spring force). A stored spring force only occurs when the user pushes the electronic module past its operational first inserted position just before ejection. Thus, the springs are less prone to permanent deformation, and the housing of the electrical connector is less prone to wear or breakage over time. There are also less parts than a conventional PCMCIA connector. This allows the connector to be manufactured at a reduced cost.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electrical connector comprising:
   a frame having a receiving area which is sized and shaped to be removably received an end of at least one electronic module;
   electrical contacts connected to the frame, the contacts comprising spring contacts arranged in two spaced arrays side by side and having surface contact areas adapted to make connection to contact pads on the end of the electronic module at a first inserted position; and
   a system for retaining and ejecting the at least one electronic module from connection with the electrical contacts, the system comprising force storing members adapted to push on the end of the electronic module when the module is moved past the first inserted position and adapted to quickly release contact with the at least one electronic module, wherein when the electronic module is inserted into the frame to the first inserted position the contacts are adapted to make electrical connection with the contact pads on the end of the electronic module at a fully connected position before the electronic module deforms the force storing members, wherein the electronic module does not substantially deform the force storing members when the electronic module and the contacts are at the fully connected position.

2. An electrical connector as in claim 1 wherein the receiving area of the frame is sized and shaped to removably received an end of a first electronic module or alternatively receive ends of two side-by-side second thinner width electronic modules.

3. An electrical connector as in claim 2 further comprising an electromagnetic interference (EMI) cover connected to the frame and covering a top side of the receiving area, the EMI cover having a width for covering a top side of the first electronic module or top sides of the two second thinner width electronic modules.

4. An electrical connector as in claim 1 wherein the force storing members comprise leaf springs located at a rear end of the receiving area, and wherein the leaf springs are adapted to be depressed towards the rear end of the receiving area.

5. An electrical connector as in claim 4 wherein the leaf springs comprise a general V shape.

6. An electrical connector as in claim 1 wherein the retaining and ejecting system comprises a push-to-eject system which requires a user to push the electronic module in past the first inserted position and quickly release contact with the module to allow the module to be ejected by the force storing members.

7. An electrical connector as in claim 6 wherein the retaining and ejecting system does not comprise a latch for latching the electronic module to the frame, and the retaining and ejecting system merely uses friction between the electronic module and the frame, and between the electronic module and the electrical contacts to retain the electronic module at the first inserted position.

8. An electrical connector as in claim 1 wherein the retaining and ejecting system uses friction between the electronic module, the frame, and the electrical contacts to retain the electronic module at the first inserted position, and wherein the force storing members are adapted to provide a module releasing spring force comprising:

$$F(rs) > [2(U_1 \times N_C \times NF) + (U_2 \times W_C)]$$

where:
  F(rs)=Module releasing spring force
  $U_1$=Coefficient of friction of contact
  $N_C$=Number of contacts
  NF=Normal force
  $U_2$=Coefficient of friction of frame
  $W_C$=Module weight.

9. An electrical connector as in claim 1 wherein the receiving area is adapted to receive a PCMCIA card as the electronic module.

10. An electrical connector comprising:
    a frame having a receiving area which is sized and shaped to be removably received an end of at least one electronic module;
    electrical contacts connected to the frame, the contacts comprising spring contacts adapted to make removable connection to contact pads on the end of the electronic module at a first inserted position; and
    a system for retaining and ejecting the at least one electronic module from connection with the electrical contacts, the system comprising force storing members adapted to push on the end of the electronic module when the module is moved past the first inserted position, wherein when the electronic module is inserted into the frame the contacts are adapted to make electrical connection with the contact pads on the end of the electronic module at a fully connected position before the electronic module deforms the force storing members,
    wherein the electrical contacts comprise surface contact areas arranged in two spaced arrays, and wherein at least one of the force storing members is located in an area between the two arrays.

11. An electrical connector comprising:

a frame having a receiving area which is sized and shaped to be removably received an end of at least one electronic module;

electrical contacts connected to the frame, the contacts comprising spring contacts adapted to make removable connection to contact pads on the end of the electronic module at a first inserted position; and a system for retaining and ejecting the at least one electronic module from connection with the electrical contacts, the system comprising force storing members adapted to push on the end of the electronic module when the module is moved past the first inserted position, wherein when the electronic module is inserted into the frame the contacts are adapted to make electrical connection with the contact pads on the end of the electronic module at a fully connected position before the electronic module deforms the force storing members, wherein the force storing members comprise coil compression springs located at opposite lateral sides of the receiving area and in a middle section of the receiving area.

12. An electrical connector comprising:

a frame having a receiving area which is sized and shaped to removably received an end of a first electronic module or alternatively receive ends of two side-by-side second thinner width electronic modules;

electrical contacts connected to the frame, wherein the contacts are adapted to make removable connection with contacts on the ends of the electronic modules at a first inserted position; and a system for retaining and ejecting the electronic modules from connection with the electrical contacts, the system comprising a plurality of force storing members adapted to push on the ends of the electronic modules, at least one of the force storing members comprising a spring that is located in an end of a middle section of the receiving area, wherein the system comprises a push-to-eject system which requires a user to push the electronic modules in past the first inserted position and quickly release contact with the module to allow the module to be ejected by the force storing members, and wherein the retaining and ejecting system does not comprise a latch for latching the electronic modules to the frame.

13. An electrical connector as in claim 12 wherein the contacts comprise spring contacts adapted to make removable connection to contact pads on the ends of the electronic modules at a first inserted position.

14. An electrical connector as in claim 12 wherein the retaining and ejecting system comprises the force storing members being adapted to push on the end of the electronic modules when the modules are moved past the first inserted position, wherein when the electronic module is inserted into the frame the contacts are adapted to make electrical connection with the contact pads on the end of the electronic module before the electronic module moves the force storing members.

15. An electrical connector as in claim 12 wherein the electrical contacts comprise surface contact areas arranged in two spaced arrays, and wherein at least one of the force storing members is located in an area between the two arrays.

16. An electrical connector as in claim 12 wherein the force storing members comprise coil compression springs located at opposite lateral sides of the receiving area and two of the springs are located in a middle section of the receiving area.

17. An electrical connector as in claim 12 wherein the force storing members comprise leaf springs located at a rear end of the receiving area, and wherein the leaf springs are adapted to be depressed towards the rear end of the receiving area.

18. An electrical connector as in claim 17 wherein the leaf springs comprise a general V shape.

19. An electronic module electrical connector comprising:

a frame having a receiving area which is sized and shaped to removably received an end of a first electronic module or alternatively receive ends of two side-by-side second smaller width electronic modules;

electrical contacts connected to the frame, the contacts comprising spring contacts adapted to make removable connection with surface contact pads on the ends of the electronic modules at a first inserted position; and a system for retaining and ejecting the electronic modules from connection with the electrical contacts, the system comprising a plurality of force storing members adapted to push on the ends of the electronic modules, at least one of the force storing members comprising a spring that is located in an end of a middle section of the receiving area, wherein the system comprises a push-to-eject system which requires a user to push the electronic modules in past the first inserted position and quickly release contact with the module to allow the module to be ejected by the force storing members, and wherein the retaining and ejecting system does not comprise a latch for latching the electronic modules to the frame, and wherein when the electronic modules are inserted into the frame the contacts are adapted to make electrical connection with the contact pads on the ends of the electronic modules at a fully connected position before the electronic modules move the force storing members.

20. An electrical connector as in claim 19 wherein the electrical contacts comprise surface contact areas arranged in two spaced arrays, and wherein at least one of the force storing members is located in an area between the two arrays.

21. An electrical connector as in claim 20 wherein the leaf springs comprise a general V shape.

22. An electrical connector as in claim 19 wherein the force storing members comprise coil compression springs located at opposite lateral sides of the receiving area and in a middle section of the receiving area.

23. An electrical connector as in claim 19 wherein the force storing members comprise leaf springs located at a rear end of the receiving area, and wherein the leaf springs are adapted to be depressed towards the rear end of the receiving area.

* * * * *